United States Patent
Schwarz

(10) Patent No.: US 6,433,039 B1
(45) Date of Patent: Aug. 13, 2002

(54) INK JET PRINTING WITH INKS CONTAINING COMB POLYMER DISPERSANTS

(75) Inventor: William M. Schwarz, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/650,500

(22) Filed: May 20, 1996

(51) Int. Cl.$^7$ ................................................. C09D 5/00
(52) U.S. Cl. ..................................................... 523/161
(58) Field of Search ........................... 523/161; 524/549

(56) References Cited

U.S. PATENT DOCUMENTS

| | | | |
|---|---|---|---|
| 4,597,794 A | 7/1986 | Ohta et al. | 106/20 |
| 4,832,984 A | * 5/1989 | Hasegawa | 427/161 |
| 5,101,218 A | * 3/1992 | Sakaki | 346/1.1 |
| 5,205,861 A | * 4/1993 | Matrick | 524/101 |
| 5,554,212 A | * 9/1996 | Bui | 524/27 |
| 5,571,850 A | * 11/1996 | Ma | 523/160 |
| 5,589,522 A | * 12/1996 | Beach | 523/160 |
| 5,607,999 A | * 3/1997 | Shimizu | 524/503 |
| 5,623,294 A | * 4/1997 | Takizawa | 524/96 |
| 5,656,071 A | * 8/1997 | Kappele | 106/31.76 |

FOREIGN PATENT DOCUMENTS

DE 3803810 A1 8/1989

OTHER PUBLICATIONS

Effect of a Comb–Like Amphiphilic Polymers on the Stability of Alumina Dispersions vol. 69, p. 155.
Effect of Hydrophobically Modified Comb–Like Polymer on Interfacial Properties of Coal vol. 66, p. 155.
Comb Copolymers –A Unique Class of Polymer Surfactants Royal Society of Chemistry, 1992.
Stability of Graphite Suspensions in the Presence of an Amphiphilic Comb–Like Polymer vol. 13, #2, p. 195.

* cited by examiner

*Primary Examiner*—Paul R. Michl
(74) *Attorney, Agent, or Firm*—Judith L. Byorick

(57) ABSTRACT

Disclosed is a process which comprises incorporating into an ink jet printing apparatus an ink composition which comprises water, a colorant, and a comb copolymer, and causing droplets of the ink to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern.

19 Claims, No Drawings

INK JET PRINTING WITH INKS CONTAINING COMB POLYMER DISPERSANTS

BACKGROUND OF THE INVENTION

The present invention is directed to ink jet printing processes. More specifically, the present invention is directed to ink jet printing processes with ink compositions particularly suitable for use in ink jet printing processes, particularly thermal ink jet printing processes. One embodiment of the present invention is directed to a process which comprises incorporating into an ink jet printing apparatus an ink composition which comprises water, a colorant, and a comb copolymer, and causing droplets of the ink to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. Nos. 4,601,777, 4,251,824, 4,410,899, 4,412,224, and 4,532,530, the disclosures of each of which are totally incorporated herein by reference.

Ink jet inks containing pigment particles as colorants are known. For example, in Dunn, "Waterproof Carbon Black Ink for Ink Jet Printing," Xerox Disclosure Journal, Vol. 4, No. 1 (1979), a waterproof colloidal carbon black ink for ink jet printing is disclosed. The ink is prepared by incorporating a water-resistant acrylic polymer binder into an ink jet ink, such that the ink composition comprises about 9 percent by weight of carbon black, about 2 percent by weight of an anionic polymer-type dispersing agent, about 5 percent by weight of polyethylene glycol, about 8 percent by weight of Carboset 514H, and about 76 percent by weight of ammoniated distilled water. Sufficient ammonium hydroxide is added to the ink to adjust the pH to 8.5. According to the article, this ink composition is particularly suited to ink jets run in a continuous mode.

U.S. Pat. No. 4,597,794 (Ohta et al.), the disclosure of which is totally incorporated herein by reference, discloses an ink jet recording process which comprises forming droplets of an ink and recording on an image receiving material by using the droplets. wherein the ink is prepared by dispersing fine particles of a pigment into an aqueous dispersion medium containing a polymer having both a hydrophilic and a hydrophobic construction portion. The hydrophilic portion constitutes a polymer of monomers having mainly additively polymerizable vinyl groups, into which hydrophilic construction portions such as carboxylic acid groups, sulfonic acid groups, sulfate groups, and the like are introduced. Pigment particle size may be from several microns to several hundred microns. The ink compositions disclosed may also include additives such as surfactants, salts, resins, and dyes.

"Effect of Hydrophobically Modified Comb-Like Polymer on Interfacial Properties of Coal," C. Li et al., *Colloids*

*and Surfaces*, vol. 66, p. 39 (1992), the disclosure of which is totally incorporated herein by reference, discloses surface modification of coal by a comb-type hydrophobic-hydrophilic copolymer. The coal became more hydrophobic with increasing polymer concentration regardless of its original floatability, suggesting that free segments of adsorbed polymer molecules can reorient with the hydrocarbon chains protruding into the gas phase. The minimum polymer concentrations needed to mask completely the surface charge of coal corresponded to those required to increase the coal floatability to the maximum. The coal become more hydrophobic with increasing polymer concentration until a plateau was reached, and further increase in the polymer concentration caused a decrease in the hydrophobicity. suggested to be due to the consumption of the hydrocarbon chains on unadsorbed polymer segments by the formation of micellar aggregates.

"Effect of a Comb-Like Amphiphilic Polymer on the Stability of Alumina Dispersions," C. Li et al., *Colloids and Surfaces*, vol. 69, p. 155 (1992), the disclosure of which is totally incorporated herein by reference, discloses the effect of a hydrophobically modified maleic anhydride α-olefin polymer which has a comb-like structure on the stability of alumina suspensions. In the absence of the polymer, the suspension stability was controlled by the electrostatic repulsion between particles. Addition of the polymer was found to have a significant effect only when the electrostatic repulsion was not sufficient to maintain a stable suspension. The results suggested that interactions between hydrocarbon chains reduced the effect of electrostatic repulsion between alumina particles at low polymer concentrations and that at high polymer concentrations the hydrocarbon chains form micellar aggregates, enhancing the stability of the suspension by both steric and electrostatic repulsion.

"Comb Copolymers—A Unique Class of Polymer Surfactants," G. Krüger et al., *Industrial Applications of Surfactants III* (*Proc. Royal Soc. Chem.*, September 1991), D. R. Karsa, ed., Royal Society of Chemistry (Cambridge 1992), the disclosure of which is totally incorporated herein by reference, discloses various applications of comb copolymers.

"Stability of Graphite Suspensions in the Presence of an Amphiphilic Comb-Like Polymer," Q. Xu et al., *J. Dispersion Science and Technology*, vol. 13, no. 2, p. 195 (1992), the disclosure of which is totally incorporated herein by reference, discloses the effect of an amphiphilic comb-like polymer on the stability of aqueous graphite suspensions. Suspensions of graphite were better dispersed as the concentration of the comb-like polymer was increased. Furthermore, the stability at higher pH values was greater than that at lower values. The electrophoretic mobility of graphite was measured with and without the polymer to determine the mechanism of colloidal stabilization, and a combination of steric and electrostatic forces was proposed to be the cause for the observed behavior.

German patent document DE 3803810 A1, the disclosure of which is totally incorporated herein by reference, discloses pigment and carbon black preparations containing a pigment and/or carbon black, a paste binder, and a copolymer of an alpha-olefin and an ester of an alpha, beta-unsaturated dicarboxylic acid and a 4–30C alcohol optionally with non-adjacent O atoms in the carbon chain. Preferably, the pigment is an organic pigment (azo, anthraquinone, thioindigo, phthalocyanine, quinacridone, diozine, naphthalenetetracarboxylic acid, peryenetetracarboxylic acid or isoinolinone type, metal complex pigment or lacquered dyestuff) or an inorganic pigment (ZnS CdS/CdSe, ultramarine, $TiO_2$, $Fe_2O_3$, Ni— or Cr/Sb oxide, cobalt blue, Cr oxide or chromate pigment), preferably Cu phthalocyanine pigment, disazo-type arylamide pigment or carbon black; the paste binder is a polyether- or polyester-polyol or a non-poly-hydroxy-functional dicarboxylic ester, preferably an ester of phthalic or adiptic acid and a polyalcohol; the copolymer is based on 10–16C alpha-olefins, maleic acid and an ethoxylated alcohol. The composition is suitable for pigmenting plastics, especially foam materials.

While known compositions and processes are useful for their intended purposes, a need remains for improved ink compositions and printing processes. In addition, there remains a need for improved ink compositions particularly suitable for use in thermal ink jet printing processes. Further, there is a need for ink compositions containing pigment colorants wherein the concentration of pigment in the ink can be increased without impairing ink stability. Additionally, there is a need for ink compositions suitable for use in ink jet printing processes wherein the resulting images exhibit improved solid area density. There is also a need for ink compositions containing pigment colorants and having relatively low viscosity. A need further remains for ink compositions containing pigment colorants and suitable for use in thermal ink jet printing processes which exhibit enhanced jetting characteristics. In addition, there is a need for ink compositions containing pigment colorants and exhibiting enhanced dispersion stability. There is also a need for ink compositions containing pigment colorants which are available in a wide variety of colors. Additionally, there is a need for ink compositions containing pigment colorants which are compatible with a wide variety of ink additives present to enhance ink performance in an ink jet printing process. A need also remains for ink compositions suitable for ink jet printing containing pigment colorants of a wide variety of average particle diameters. There is also a need for pigmented thermal ink jet ink compositions having moderate surface tensions (typically of from about 35 to about 40 dynes per centimeter) which enable minimal front face wetting of the printhead. A need further remains for ink jet ink compositions which enable images with good line edge quality.

SUMMARY OF THE INVENTION

It is an object of the present invention to provide ink compositions and processes with the above advantages.

It is another object of the present invention to provide improved ink compositions and printing processes.

It is yet another object of the present invention to provide improved ink compositions particularly suitable for use in thermal ink jet printing processes.

It is still another object of the present invention to provide ink compositions containing pigment colorants wherein the concentration of pigment in the ink can be increased without impairing ink stability.

Another object of the present invention is to provide ink compositions suitable for use in ink jet printing processes wherein the resulting images exhibit improved solid area density.

Yet another object of the present invention is to provide ink compositions containing pigment colorants and having relatively low viscosity.

Still another object of the present invention is to provide ink compositions containing pigment colorants and suitable for use in thermal ink jet printing processes which exhibit enhanced jetting characteristics.

It is another object of the present invention to provide ink compositions containing pigment colorants and exhibiting enhanced dispersion stability.

It is yet another object of the present invention to provide ink compositions containing pigment colorants which are available in a wide variety of colors.

It is still another object of the present invention to provide ink compositions containing pigment colorants which are compatible with a wide variety of ink additives present to enhance ink performance in an ink jet printing process.

Another object of the present invention is to provide ink compositions suitable for ink jet printing containing pigment colorants of a wide variety of average particle diameters.

Yet another object of the present invention is to provide pigmented thermal ink jet ink compositions having moderate surface tensions (typically of from about 35 to about 40 dynes per centimeter) which enable minimal front face wetting of the printhead.

Still another object of the present invention is to provide ink jet ink compositions which enable images with good line edge quality.

These and other objects of the present invention (or specific embodiments thereof) can be achieved by providing a process which comprises incorporating into an ink jet printing apparatus an ink composition which comprises water, a colorant, and a comb copolymer, and causing droplets of the ink to be ejected in an imagewise pattern onto a substrate.

DETAILED DESCRIPTION OF THE INVENTION

The ink compositions for the present invention generally comprise water, a colorant, and a comb copolymer. The ink vehicle can consist solely of water, or it can comprise a mixture of water and a water soluble or water miscible organic component. Aqueous ink compositions, such as those suitable for use in ink jet printing, particularly thermal ink jet printing, generally also contain a humectant. The humectant typically is an organic material miscible with water. Examples of suitable humectants include ethylene glycol, propylene glycol, diethylene glycols, glycerine, dipropylene glycols, polyethylene glycols, polypropylene glycols, amides, urea, substituted ureas, ethers, carboxylic acids, esters, alcohols, organosulfides, organosulfoxides, sulfones (such as sulfolane), alcohol derivatives, carbitol, butyl carbitol, cellusolve, ether derivatives, amino alcohols, ketones, N-methylpyrrolidinone, 2-pyrrolidinone, cyclohexylpyrrolidone, hydroxyethers, amides, sulfoxides, lactones, and other water miscible materials, as well as mixtures thereof. When mixtures of water and water soluble or miscible organic liquids are selected as the ink vehicle, the water to organic ratio typically ranges from about 100:0 to about 30:70, and preferably from about 97:3 to about 40:60. The humectant can be present in the ink composition in any effective amount. Typically, the humectant is present in an amount of from about 3 to about 70 percent by weight, preferably from about 5 to about 50 percent by weight, and more preferably from about 10 to about 30 percent by weight, although the amount can be outside these ranges. The ink vehicle itself is typically present in an amount of from about 80 to about 99.9 percent by weight of the ink, and preferably from about 90 to about 99 percent by weight of the ink, although the amount can be outside these ranges.

Also contained in the ink composition for the present invention is a colorant. Preferably, the colorant includes pigment particles. The pigment can be of any desired color, such as black, cyan, magenta, yellow, red, blue, green, brown, or the like, as well as mixtures thereof. Examples of suitable pigments include various carbon blacks such as channel black, furnace black, lamp black, Raven® 5250, Raven® 5750, Raven® 3500 and other similar carbon black products available from Columbia Company, Regal® 330, Black Pearl® L, Black Pearl® 1300, and other similar carbon black products available from Cabot Company, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue2G (Pigment Blue 15:3), Hostafine® Black T (Pigment Black 7), and Hostafine® Black TS (Pigment Black 7), available from Hoechst Celanese Corporation, Normandy Magenta RD2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Other pigments can also be selected. Particularly preferred pigment particles are nonmutagenic and nontoxic carbon black particles with a polyaromatic hydrocarbon content of less than about 1 part per million. The pigment particles can be of any desired size. Typical average particle diameters for pigment particles in inks to be used in thermal ink jet printing processes, for example, are from about 0.001 to about 10 microns, preferably from about 0.01 to about 3 microns, and more preferably less than about 1 micron, although the average particle diameter can be outside these ranges.

The pigment particles can be present in the ink in any desired amount. Typically the pigment particles are present in an amount of from about 1 to about 20 percent by weight, preferably from about 1 to about 10 percent by weight, more preferably from about 2 to about 8 percent by weight, and even more preferably from about 4 to about 7 percent by weight, although the amount can be outside these ranges.

The colorant can also include a dye, either alone or in combination with pigment particles. Any suitable dye or mixture of dyes compatible with the ink liquid vehicle can be used, with water soluble anionic dyes and cationic dyes being preferred. Examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza[18]annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-175; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® (Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Hoechst, such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), various Reactive dyes, including Reactive Black dyes, Reactive Blue dyes, Reactive Red dyes, Reactive Yellow dyes, and the like, as well as mixtures thereof. The dye is present in the ink composition in any effective amount, typically from about 0.5 to about 15 percent by weight, and preferably from about 1 to about 10 percent by weight, although the amount can be outside of these ranges.

The ink compositions for the present invention also contain at least one comb copolymer. Suitable comb copolymers for the present invention include a polymeric backbone having both hydrophilic chain side groups and hydrophobic chain side groups. Preferably, the comb copolymer is of the general formula

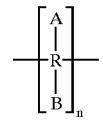

wherein R is an organic group having at least two carbon atoms, such as a hydrocarbon group, a group containing carbon atoms and one or more hetero atoms, such as oxygen, nitrogen, sulfur, or the like, wherein R may be either substituted in addition to the A and B groups or unsubstituted (except for the A and B groups), A is a hydrophobic group, such as a substituted or unsubstituted hydrocarbon containing at least about 6 carbon atoms bonded in a linear chain, and preferably containing from about 6 to about 22 carbon atoms (wherein the chain may be either substituted or unsubstituted), a polypropylene oxide group, or the like, B is a hydrophilic group, typically containing at least about 9 atoms bonded in a linear chain (wherein the chain may be either substituted or unsubstituted), and may have about 120 or more atoms (and more preferably from about 20 to about 30 atoms) bonded in a linear chain, and n is an integer representing the number of repeating monomer units. It should be emphasized that A and B need not be bonded to the same atom within the R group. The terms hydrophobic and hydrophilic as used herein are relative, in that the B group is hydrophilic with respect to the A group. The B group exhibits good water solubility, typically being soluble in water in a concentration of at least about 0.2 grams per milliliter, while the A group exhibits poor water solubility, typically being soluble in water in a concentration of no more than about 0.01 grams per milliliter. The A group is sufficiently hydrophobic to enable dispersion of the selected pigment in the selected ink vehicle, while the B group is sufficiently hydrophilic to enable the comb polymer to be soluble in the selected ink vehicle. The repeating monomer unit within the comb polymer typically has an HLB value of from about 8 to about 30, although the HLB value can be outside this range, with the preferred HLB value being a function of the specific pigment and specific ink vehicle selected. HLB values are calculated by the method known in the art, as described in, for example, *Surfactants and Interfacial Phenomena*, Milton J. Rosen, John Wiley & Sons (1989), the disclosure of which is totally incorporated herein by reference. The value of n preferably is such that the molecular weight of the comb copolymer is no more than about $5 \times 10^5$, and more preferably no more than about 100,000. The value of n may be as low as 2, and as high as about 800, with preferred values for n being from about 4 to about 40, although the value can be outside this range. It is preferred that n be at least sufficient to result in a molecular weight of the comb copolymer of at least about 500. Preferred molecular weights are from about 2,000 to about 50,000, although the value can be outside this range. Examples of suitable hydrophobic groups (A) include (but are not limited to) saturated alkyl groups, unsaturated alkyl groups, substituted saturated and unsaturated alkyl groups, such as perfluoroalkyl groups, aryl groups, substituted aryl groups, polypropylene oxide groups, and the like. Examples of suitable hydrophilic groups (B) include (but are not limited to) polyethylene oxide chains, polyimine chains, substituted polyimine chains, polyvinyl alcohol chains, polyvinyl carboxylate chains, zwitterionic chains, methacrylate chains, hydrocarbon chains substituted with hydrophilic substituents (such as ammonium groups, carboxylate groups, sulfonate groups, other cationic or anionic or zwitterionic groups, and the like), and the like. Polyethylene oxide chains are preferred B groups because of their easy availability and the ease of synthesizing compounds containing these moieties. When the hydrophilic group (B) is a polyethylene oxide chain, preferably at least about 3 repeating ethylene oxide groups are present, with 40 or more repeating ethylene oxide groups being suitable in some situations. Examples of suitable substituents on R, A, and B include (but are not limited to) alkyl groups, aryl groups, arylalkyl groups, hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, halogen atoms, nitro groups, sulfone groups, acyl groups, acid anhydride groups, azide groups, and the like, wherein two or more substituents can be joined together to form a ring.

One example of a suitable comb copolymer for the ink compositions for the present invention is of the above general formula, wherein R has 4 carbon atoms and has a carboxylic acid substituent, and is of the formula

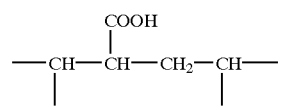

A is a linear saturated alkyl group of the formula $C_{10}H_{21}$, B is of the formula

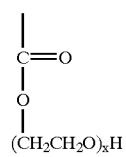

wherein x is 7 or 8, and n is an integer such that the molecular weight is about 20,000. This compound is a maleic anhydride-α-olefin copolymer of the formula

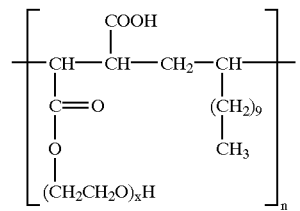

wherein x is 7 or 8 and n is an integer representing the number of repeating monomer units and generally being between about 30 and about 35, with an average molecular weight is about 20,000, available as DAPRAL® GE 202 from Akzo Chemie America, Chicago, Ill. Also suitable are derivatives of this material, such as the reaction products of the polymer with monovalent metal hydroxides, polyvalent metal hydroxides, amines, polyamines, alkanolamines, alcohols, or the like. Specific examples of suitable derivatives include the sodium salt (commercially available as DAPRAL® GE 204 NA), the dimethylethanolamine salts (commercially available as DAPRAL® GE 205 DMA and DAPRAL® GE 206 DMA), and the like. Materials of this general formula can also be prepared by, for example, the reaction of an anhydride (such as maleic anhydride) with a hydrophilic chain (such as polyethylene oxide) of the desired length with heating, followed by reaction of the resulting product with a hydrophobic chain (such as an alpha-olefin) to obtain the desired comb copolymer, as follows:

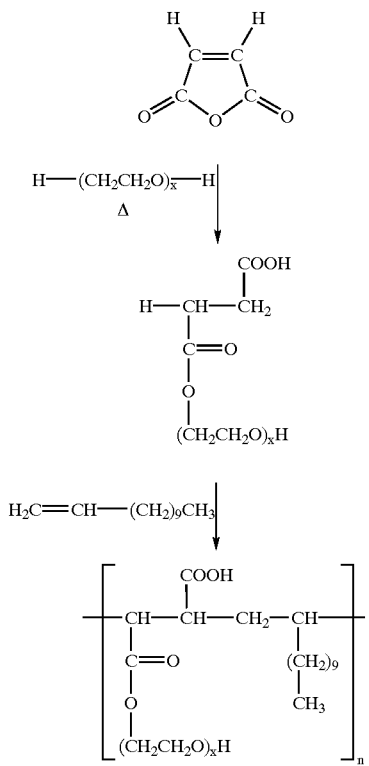

Additional suitable comb copolymers are disclosed in, for example, O. W. Webster, "Living Polymerization Methods," *Science*, vol. 251, p. 887 (1991), the disclosure of which is totally incorporated herein by reference.

The comb copolymer is present in the ink composition for the present invention in any effective amount. Typically the comb copolymer is present in an amount of from about 0.04 to about 4.0 percent by weight of the ink, preferably from about 0.07 to about 2.0 percent by weight of the ink, and more preferably from about 0.1 to about 0.5 percent by weight of the ink, although the amount can be outside these ranges.

Inks containing the comb copolymer, a colorant, and water can be prepared by any desired or suitable method. Simple stirring of the ingredients suffices in many instances. The ingredients can be heated during mixing if desired. A pigment dispersion can be prepared by, for example, treating pigment particles with a particle size reduction process which utilizes ball milling, homogenization, sonification, or a combination thereof in the presence of water and, if desired, the comb copolymer and/or at least one dispersing agent. The dispersing agent or agents can be nonionic, anionic, cationic, or amphoteric, or a combination thereof. Suitable dispersing agents, surfactants, and wetting agents include Igepal® series surfactants, alkyl or dialkyl phenoxy poly(ethyleneoxy)ethanol derivatives including Igepal® CA-630, Igepal® CA-720, Igepal® CO-720, Igepal® CO-890, Igepal® CA-897, Igepal® CO-970, Igepal® DM-970, all available from Rhone-Poulenc Company, copolymers of naphthalene sulfonic salts and formaldehyde, including Daxad® 11, Daxad® 11 KLS, Daxad® 19, Daxad® 19K, and the like, all available from W.R. Grace & Company, the Lomar® series (including Lomar® D and the like), available from Diamond Shamrock Corporation, the Tamol series (including Tamol® SN and the like), available from Rohm and Haas Company, the Triton® series (including Triton® X-100, Triton® X-102, Triton® X-114, Triton® CF 21. Triton® CF 10, and the like), all available from Rohm and Haas Company, Duponol® ME Dry, Duponol® WN, Merpol® RA, Merpol® SE, Merpol® SH, Merpol® A, Zelec® NK, and the like, all available from E.I. Du Pont de Nemours & Company, the Tergitol® series, available from Union Carbide Company, the Surfynol® series (GA, TG, 465H, CT-136, and the like), available from Air Products and Chemicals Co., copolymers of styrene and maleic acid salts, such as those available from Alco Chemical Inc., polyacrylate derivatives, copolymers of acrylic monomers or methacrylic monomers and their salts, polystyrenesulfonate salts, and the like, as well as mixtures thereof. The dispersing agent is typically present in an amount of from about 0.1 to about 150 percent by weight of the pigment, and preferably from about 1 to about 100 percent by weight of the pigment, although the amount can be outside these ranges.

Reduction of pigment particle size can be achieved by various processes, such as ball milling, roll milling, paintshaking, mechanical attrition, microfluidization in a liquid jet interaction chamber at a high liquid pressure, sonification, precipitation, acid pasting, and the like. It is preferred to reduce the size of the pigment particles in the presence of water and a dispersing agent for the preparation of a pigment dispersion. The pigment particles treated with the dispersing agent form a stable colloidal pigment dispersion. The pigment dispersion can then be used to prepare a pigmented ink in an aqueous medium comprising a liquid vehicle, the pigment dispersion, and any additional desired ink additives. If necessary, additional steps of centrifugation and filtration can be carried out to assure the maintenance of good pigment particle size in the ink after mixing the ink ingredients together. The ink or the pigment dispersion (higher pigment concentration) can then be admixed with a dye. The pigment particles can be added to an ink jet ink which comprises water, a dye, an optional humectant, an optional biocide, an optional pH buffer agent, an optional chelating agent, an optional penetrant or drying accelerating agent for decreasing drying time, an optional antioxidant, an optional anticlogging agent, and an optional monomeric or polymeric additive with thorough mixing. If necessary, a filtration process can be carried out to remove large or unstable pigment particles.

Other additives can also be present in the inks. For example, one or more surfactants or wetting agents can be added to the ink. These additives may be of the cationic, anionic, or nonionic types. Suitable surfactants and wetting agents include sodium lauryl sulfate, Tamol® SN, Tamol® LG, those of the Triton® series available from Rohm and Haas Company, those of the Marasperse® series, those of the Igepal® series available from GAF Company, those of the Tergitol® series, and other commercially available surfactants. These surfactants and wetting agents are present in effective amounts. generally from 0 to about 15 percent by weight, and preferably from about 0.01 to about 8 percent by weight, although the amount can be outside of this range.

Polymeric additives can also be added to the inks to enhance the viscosity and the stability of the ink. Water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethylene oxide, block copolymers of polyethylene oxide and polypropylene oxide, polyvinylpyridine, polyethyleneimine, polyhydroxyethyl ethyleneimine, polyquaternary salts, and the like are typical polymeric additives. Polymeric additives can be present in the ink of the present invention in amounts of from 0 to about 10 percent by weight, and preferably from about 0.01 to about 5 percent by weight, although the amount can be outside this range.

One example of an additive to the inks is a polymeric additive consisting of two polyalkylene oxide chains bound to a central bisphenol-A-type moiety. This additive is of the formula

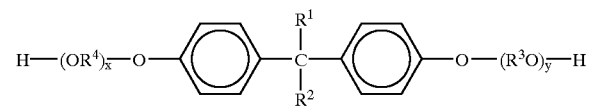

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers*, N. G. Gaylord, John Wiley & Sons, New York (1963) and "Laboratory Synthesis of Polyethylene Glycol Derivatives," J. M.

Harris, *J. Molecular Science—Rev. Macromol. Chem. Phys.*, C25(3), 325–373 (1985), the disclosures of each of which are totally incorporated herein by reference. The polyalkylene oxide additive is generally present in the ink in an amount of at least about 1 part per million. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

Other optional additives to the inks include biocides such as Dowicil 150, 200, and 75, benzoate salts, sorbate salts, and the like, present in an amount of from about 0.0001 to about 4 percent by weight, and preferably from about 0.01 to about 2.0 percent by weight, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, or the like.

In specific embodiments of the present invention, the ink compositions are generally of a viscosity suitable for use in thermal ink jet printing processes. Typically, the ink viscosity is no more than about 5 centipoise, and preferably is from about 1 to about 3 centipoise, although the viscosity can be outside this range.

Ink compositions suitable for ink jet printing can be prepared by any suitable process. Typically, the inks are prepared by simple mixing of the ingredients. One process entails mixing all of the ink ingredients together and optionally filtering the mixture to obtain an ink. Inks can be prepared by preparing a conventional ink composition according to any desired process, such as by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The present invention is directed to a process which entails incorporating an ink composition as disclosed herein into an ink jet printing apparatus and causing droplets of the ink composition to be ejected in an imagewise pattern onto a substrate. In a particularly preferred embodiment, the printing apparatus employs a thermal ink jet process wherein the ink in the nozzle is selectively heated in an imagewise pattern, thereby causing droplets of the ink to be ejected in imagewise pattern. Any suitable substrate can be employed, including plain papers such as Xerox® 4024 papers, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink suitable for use in ink jet printers is prepared by first mixing 3 grams of DAPRAL® GE 202 (available from Akzo Chemie America, Chicago, Ill.) with 73 grams of distilled water. Thereafter, 24 grams of Raven® 5250 carbon black pigment particles are added slowly to the solution with stirring. The resulting dispersion is stirred overnight to disperse the pigment particles uniformly throughout the solution. Subsequently, 31 grams of this dispersion is added to 25 grams of ethylene glycol (Aldrich Chemical Co., Milwaukee, Wis.). To the resulting mixture is then added 0.05 grams of Dowicil 200 Preservative (Dow Chemical Co., Midland, Mich.) and 43 grams of distilled water, all with stirring. The pH of the dispersion is then adjusted to about 7 by the addition of 0.5 Molar KOH. The ink thus formed is incorporated into a Hewlett-Packard DeskJet® 500 thermal ink jet printer and black images are generated on paper.

The ink thus formed is also incorporated into a continuous-stream ink jet printer as disclosed in U.S. Pat. No. 4,347,521, the disclosure of which is totally incorporated herein by reference, which printer is subsequently modified as disclosed in U.S. Pat. No. 4,395,716, the disclosure of which is totally incorporated herein by reference, and black images are generated on paper.

The ink thus formed is also incorporated into a drop-on-demand printer DEA as disclosed in S-G. Larsson and G. Lundquist, Research Report No. 10, 1973, Chalmers University of Technology, Gothenburg, Sweden, the disclosure of which is totally incorporated herein by reference, and black images are generated on paper.

An additional ink suitable for ink jet printing is generated as described above with the exception that 11 grams of Basacid Black X34 (BASF) dye is added to the dispersion before the pH is adjusted to 7 with KOH.

EXAMPLE II

A carbon black pigment dispersion is prepared by adding Raven® 5250 carbon black (60 grams), DAPRAL® GE 202 solution (4 grams of DAPRAL® GE 202 in 60 grams of water), and distilled water (175 grams) to an attritor (O1 size from Union process Inc.) containing 1500 grams of stainless steel shots and milling for 30 minutes. After removing most of the carbon black dispersion from the attritor, additional water is added to the attritor in three portions (3×25 grams of distilled water) with mixing to repeatedly extract more carbon black dispersion from the attritor. All carbon black dispersions are combined to form a homogeneous pigment dispersion containing about 17 percent by weight carbon black.

A carbon black ink is then prepared by thorough admixing of the above carbon black dispersion (74.14 grams), distilled water (116.8 grams), Dowicil 200 (0.25 gram), isopropanol (8.75 grams), and ethylene glycol (50.0 grams). The mixture is adjusted to pH=7.8, sonified, and centrifuged (7000 RPM). Liquid carbon black ink is then separated from unsuspended solid residue and filtered through a series of filters with pore sizes of 5.0 microns, 3.0 microns, and 1.2 microns. The resulting ink contains about 4.3 percent by weight carbon black with a particle size of less than 1.2 microns. The ink thus formed is incorporated into a Hewlett-Packard DeskJet® 500 thermal ink jet printer and black images are generated on paper.

The ink thus formed is also incorporated into a continuous-stream ink jet printer as disclosed in U.S. Pat.

No. 4,347,521, the disclosure of which is totally incorporated herein by reference, which printer is subsequently modified as disclosed in U.S. Pat. No. 4,395,716, the disclosure of which is totally incorporated herein by reference, and black images are generated on paper.

The ink thus formed is also incorporated into a drop-on-demand printer DEA as disclosed in S-G. Larsson and G. Lundquist, Research Report No. 10, 1973, Chalmers University of Technology, Gothenburg, Sweden, the disclosure of which is totally incorporated herein by reference, and black images are generated on paper.

EXAMPLE III

A black ink is prepared by admixing BASF X-34 dye (40.32 grams dye concentrate containing 12.096 grams dye solids), ethylene glycol (70.0 grams), isopropanol (12.35 grams), Dowicil 200 biocide (0.35 gram), and distilled water (226.98 grams). The pH of the ink is adjusted to 7.0. The ink is then filtered through 5.0 and 1.2 micron filters.

Several inks are prepared comprising a dye and different concentrations of pigment particles. Different amounts of the dye-based ink (as prepared in the above paragraph) and the pigmented ink prepared in Example I are weighed and thoroughly mixed to yield ink jet inks containing a) 0.025 percent by weight carbon black; b) 0.05 percent by weight carbon black; c) 0.075 percent by weight carbon black; d) 0.09997 percent by weight carbon black; and e) 0.04 percent by weight carbon black). The inks thus formed are incorporated into a Hewlett-Packard DeskJet® 500 thermal ink jet printer and black images are generated on paper.

The inks thus formed are also incorporated into a continuous-stream ink jet printer as disclosed in U.S. Pat. No. 4,347,521, the disclosure of which is totally incorporated herein by reference, which printer is subsequently modified as disclosed in U.S. Pat. No. 4,395,716, the disclosure of which is totally incorporated herein by reference, and black images are generated on paper.

The inks thus formed are also incorporated into a drop-on-demand printer DEA as disclosed in S-G. Larsson and G. Lundquist, Research Report No. 10, 1973, Chalmers University of Technology, Gothenburg, Sweden, the disclosure of which is totally incorporated herein by reference, and black images are generated on paper.

Other embodiments and modifications of the present invention may occur to those skilled in the art subsequent to a review of the information presented herein, these embodiments and modifications, as well as equivalents thereof, are also included within the scope of this invention.

What is claimed is:

1. A process which comprises incorporating into an ink jet printing apparatus an ink composition which comprises water, a colorant and a polymer selected from (a) those of the general formula

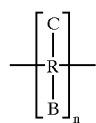

wherein R is an organic group having at least two carbon atoms, C is a hydrophobic saturated alkyl group having at least about 6 carbon atoms bonded in a linear chain, B is a hydrophilic group containing at least about 9 atoms bonded in a linear chain, and n is an integer representing the number of repeating monomer units; or (b) those of the general formula

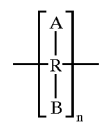

wherein R is

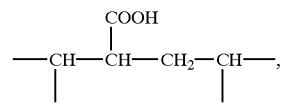

A is a hydrophobic group having at least about 6 atoms bonded in a linear chain, B is a hydrophilic group containing at least about 9 atoms bonded in a linear chain, and n is an integer representing the number of repeating monomer units, and causing droplets of the ink to be ejected in an imagewise pattern onto a substrate, wherein the colorant consists of a dye.

2. A process according to claim 1 wherein the printing apparatus employs a thermal ink jet process wherein the ink in the nozzles is selectively heated in an imagewise pattern, thereby causing droplets of the ink to be ejected in imagewise pattern.

3. A process according to claim 1 wherein one or more of R, A, and B are substituted and wherein the substituents are selected from the group consisting of alkyl groups, aryl groups, arylalkyl groups, hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, halogen atoms, nitro groups, sulfone groups, acyl groups, acid anhydride groups, azide groups, and mixtures thereof, wherein two or more substituents can be joined together to form a ring.

4. A process according to claim 1 wherein the polymer has a molecular weight of at least about 500.

5. A process according to claim 1 wherein the polymer has a molecular weight of no more than about $5 \times 10^5$.

6. A process according to claim 1 wherein A is a saturated alkyl group.

7. A process according to claim 6 wherein A or C has from about 6 to about 22 carbon atoms.

8. A process according to claim 7 wherein A or C is of the formula $C_{10}H_{21}$.

9. A process according to claim 1 wherein B includes a polyethylene oxide chain.

10. A process according to claim 9 wherein B contains at least about 3 ethylene oxide moieties.

11. a process according to claim 9 wherein B is of the formula

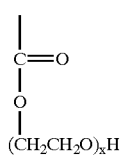

wherein x is 7 or 8.

12. A process according to claim 1 wherein n is at least 2.

13. A process according to claim 1 wherein n is from about 2 to about 800.

14. A process according to claim 1 wherein n is from about 4 to about 250.

15. A process according to claim 1 wherein n is from about 30 to about 40.

16. A process according to claim 1 wherein the comb copolymer is a maleic anhydride-α-olefin copolymer of the formula

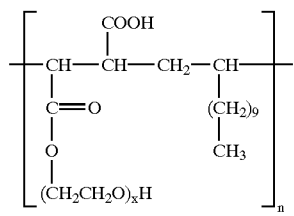

wherein x is 7 or 8 and n is an integer representing the number of repeating monomer units, said comb copolymer having an average molecular weight of about 20,000.

17. A process according to claim 1 wherein the polymer is present in the ink in an amount of from about 0.04 to about 4 percent by weight.

18. A process according to claim 1 wherein the polymer is present in the ink in an amount of from about 0.07 to about 2 percent by weight.

19. A process according to claim 1 wherein the polymer is of the formula

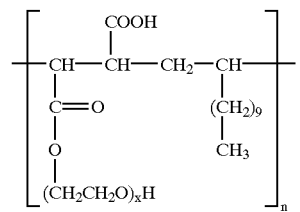

wherein x is 7 or 8 and n is an integer representing the number of repeating monomer units.

* * * * *

UNITED STATES PATENT AND TRADEMARK OFFICE
CERTIFICATE OF CORRECTION

PATENT NO.     : 6,433,039 B1                                      Page 1 of 1
DATED          : August 13, 2002
INVENTOR(S)    : William M. Schwarz It is certified that error appears in the above-identified patent and that said Letters Patent is hereby corrected as shown below:

<u>Title page,</u>
Item [*] Notice, delete "0" and insert -- 835 --.

Signed and Sealed this

Sixteenth Day of March, 2004

JON W. DUDAS
*Acting Director of the United States Patent and Trademark Office*